United States Patent [19]

Linley, Jr.

[11] 4,434,677

[45] Mar. 6, 1984

[54] ANTI-BACKLASH SPRING-MOUNTED NUT

[75] Inventor: Francis M. Linley, Jr., Easton, Conn.

[73] Assignee: Universal Thread Grinding Company, Fairfield, Conn.

[21] Appl. No.: 256,500

[22] Filed: Apr. 22, 1981

[51] Int. Cl.³ .................... F16H 55/18; F16H 1/18; F16H 27/02

[52] U.S. Cl. .................... 74/409; 74/441; 74/89.15; 74/424.8 R

[58] Field of Search .......... 74/409, 459, 424.8 A, 74/441, 89.15, 424.8 R; 411/246, 247, 301

[56] References Cited

U.S. PATENT DOCUMENTS

| | | | |
|---|---|---|---|
| 3,831,460 | 8/1974 | Linley, Jr. | 74/441 X |
| 3,842,686 | 10/1974 | Dressler | 74/459 X |
| 3,977,269 | 8/1976 | Linley, Jr. | 74/441 |
| 4,210,033 | 7/1980 | Erikson et al. | 74/409 X |
| 4,249,426 | 2/1981 | Erikson et al. | 74/424.8 A |

OTHER PUBLICATIONS

IBM Technical Disclosure Bulletin, vol. 22, No. 5, Oct. 1979, R. W. Cornell, "Anti-Backlash Spring Clamp".

Primary Examiner—Lawrence J. Staab
Assistant Examiner—Michael D. Bednarek
Attorney, Agent, or Firm—H. Gibner Lehmann; K. Gibner Lehmann

[57] ABSTRACT

An anti-backlash nut construction wherein a base portion that is adapted to be carried by a machine part, has a bore through which a lead screw can pass. The nut has a threaded portion which is connected to said base portion and which has a bore matching with the bore of the base portion, said threaded portion having a slot or slots by which it is divided into elements formed with thread formations engageable with the external threads of the screw extending through said bores. The base portion has cut-out walls forming pairs of slot ends which are located adjacent the ends of the slots of the threaded portion, so as to facilitate limited movement of the said divided elements toward and away from each other, whereby the thread formations can engage the screw with no clearance and looseness. The pairs of slot ends, together with the ends of the slots that are disposed in the threaded portion form triangles, with the slot ends being separated from each other by solid walls of the base portion. Completing the construction is a yieldable means carried by the pair of divided elements, which biases the same in directions toward each other so as to maintain them closely engaged with the said screw.

14 Claims, 8 Drawing Figures

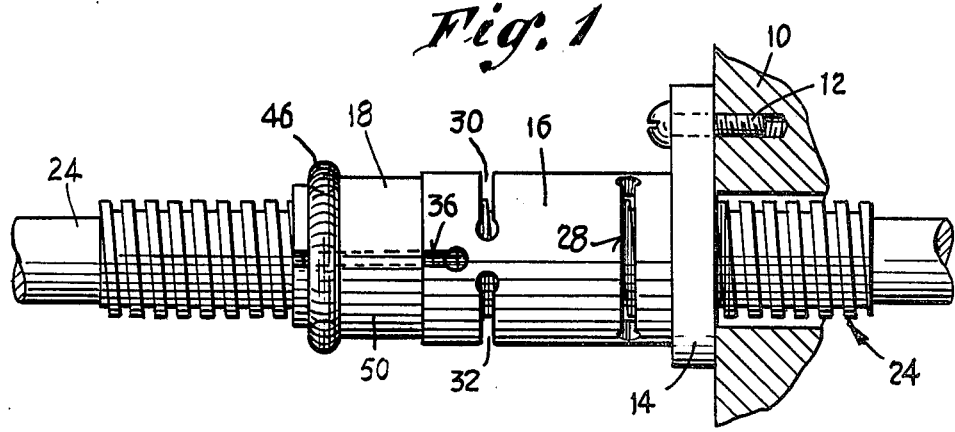
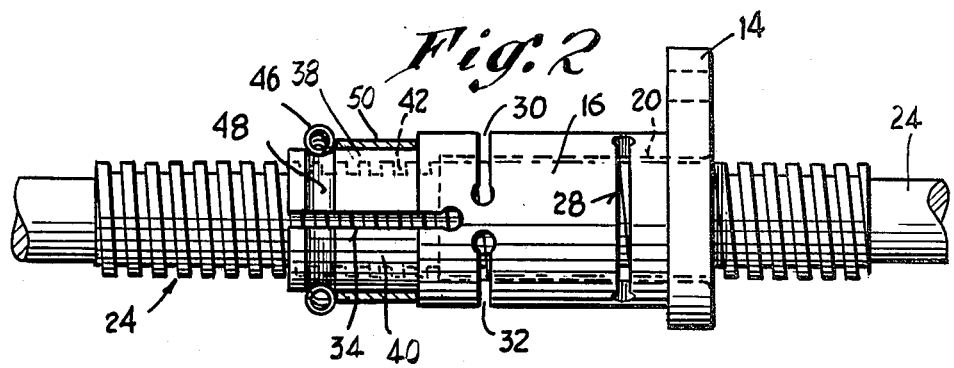
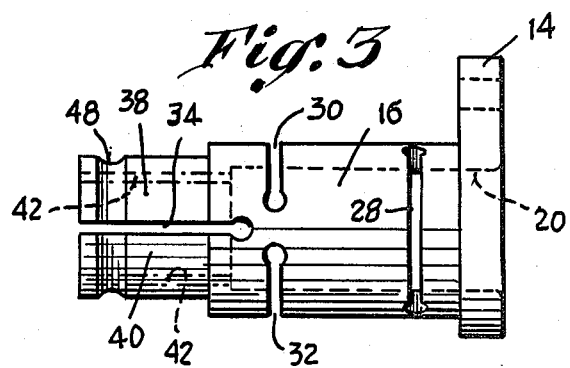
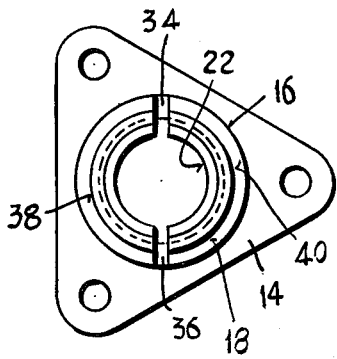
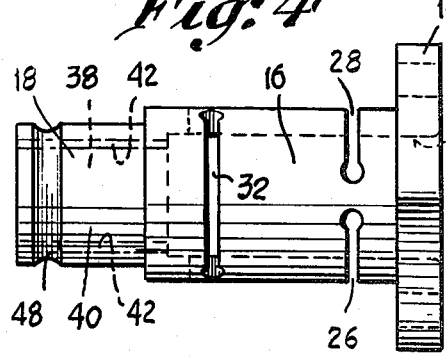
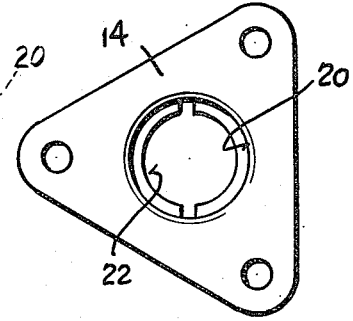

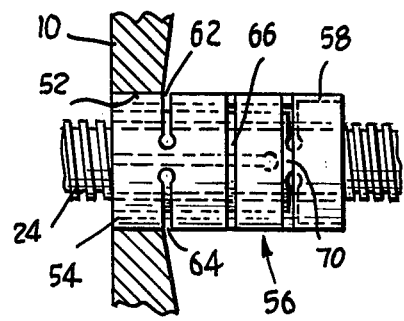
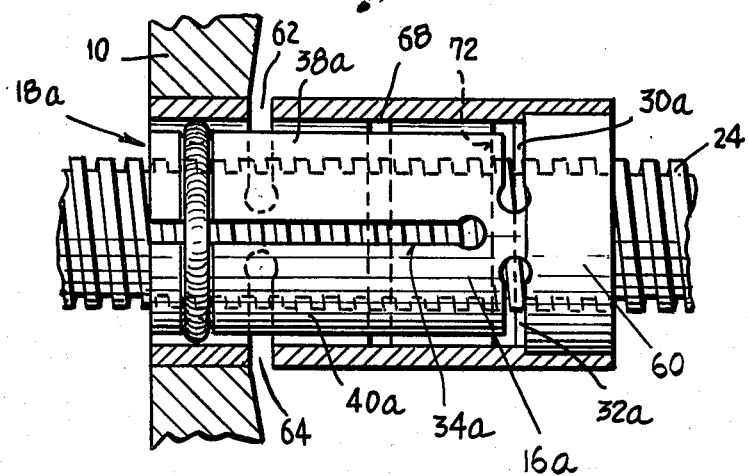

ANTI-BACKLASH SPRING-MOUNTED NUT

BACKGROUND

This invention relates to anti-backlash spring-mounted nuts, and more particularly to relatively small nuts of this type which are used with lead screws in precision movements or transverses.

The invention concerns improvements in the anti-backlash nuts described and claimed in my U.S. Pat. Nos. 3,831,460 and 3,977,269 issued respectively on Aug. 27th, 1974 and Aug. 31, 1976 and having the same ownership as the present invention and application.

In my U.S. Pat. No. 3,831,460 there is disclosed a one-piece spring-mounted anti-backlash nut construction wherein a split nut portion is carried by an aligning-type base portion, the latter having four pairs of strategically-disposed slots by which it functions somewhat in the manner of a universal joint to insure the proper coaction of the nut with the lead screw. The use of four such pairs of slots required forming or machining operations which undesirably increased the cost of the product, even though the operation of the finished piece was completely satisfactory. Moreover, the use of multiple slots could adversely affect the strength and load limits of the nut construction.

My U.S. Pat. No. 3,977,269 disclosed a more compact arrangement of self-aligning anti-backlash nut wherein the spring-mount base portion was exterior to and concentric with the nut portion, and wherein it was possible to utilize only three pairs of slots in the spring mount, to effect the aligning of the nut on the screw. By reducing the number of slots, the fabrication cost was lessened, and also the possibility existed of leaving more strength in the assemblage, while still having superior performance. But cost of production still constituted an important factor, and for certain specific uses the cost-per-formance ratio did not fit into the requirements laid down.

SUMMARY

The above cost and relative performance factors of the anti-backlash nuts of my identified patents are improved by the present invention, which has for one object the provision of a simplified and less costly angularly accommodating anti-backlash nut which is more economical to produce while at the same time providing performance of especially high quality.

Another object of the invention is to provide an improved anti-backlash, angularly-accommodating nut construction in accordance with the foregoing, which can be readily formed in one piece, insofar as the nut proper and spring support therefor are concerned.

A further object of the invention is to provide an improved nut construction as above set forth, wherein relatively few component parts of simple and straightforward design are involved in the final product, making for increased reliability and low cost.

Yet another object of the invention is to provide, in an improved angularly-adjusting nut construction, a unique simplified combination slot arrangement which gives excellent, angular accommodation by virtue of the slot disposition, as compared with the number of slots.

A feature of the invention is the provision of an aligning-type nut wherein three pairs of slots produce all the desired functions of alignment and no back-lash, with improved angular freedom in the mounting.

Another feature of the invention resides in the provision of simplified means for insuring continued engagement of the nut and screw threads, in the event of an excessive loading or malfunction of the equipment.

In accomplishing the above objects the invention provides a nut construction wherein a base portion has means adapting it to be carried by a machine part, as for example an apertured mounting flange. The base portion has a bore through which a screw can be passed, and a threaded portion is connected to the base portion, having a bore matching with that of the base portion. The threaded portion has a cut-out, or slots, by which it is divided into elements that have internal surfaces at the bore, said elements being provided with thread formations on their internal surfaces, for engagement with the external threads of a lead screw that extends through both bores. The base construction further has a cut-out configuration in the form of pairs of slot ends which are located adjacent the ends of the said slots of the threaded portion, whereby there is facilitated a limited movement of the said divided elements toward and away from each other. This enables the thread formations to engage the screw with no clearance and looseness. The slot ends together with the ends of the slots of the threaded portion are triangularly disposed, and the slot ends are separated from each other by solid walls of the base portion. In conjunction with the foregoing there are yieldable means in the form of a garter spring, which is carried by the pair of divided elements of the threaded portion, biasing the elements in directions toward each other so as to maintain them closely engaged with the said screw.

The threaded portion is shown as having two slots to divide it into two elements, and the nut construction has two pairs of slot ends respectively located adjacent the ends of the two slots of the threaded portions, maintaining the triangular disposition that has been found to improve the angular freedom in the mounting.

Encircling the threaded portion is a thin metal sleeve which is retained in place by the garter spring, and which limits the separating movement of the threaded elements so as to prevent disengagement of the threads thereof with the lead screw, in the event of an overload on the nut.

In another embodiment of the invention the threaded portion is disposed concentrically within the base portion, and the latter has three pairs of slots to provide the spring mounting which gives angular freedom to the threaded portion.

Still other features and advantages of the invention will hereinafter appear.

In the accompanying drawings, illustrating one embodiment of the invention:

FIG. 1 is a side elevational view of the anti-backlash nut construction of the invention, mounted in equipment having a lead screw passing through the nut.

FIG. 2 is a side elevational view of the nut and lead screw, with portions of the nut broken away.

FIG. 3 is a side elevational view of the one-piece plastic nut and spring mount part.

FIG. 4 is a side elevational view of the part of FIG. 3, taken rotated 90°.

FIG. 5 is a left end elevational view of the part of FIG. 4.

FIG. 6 is a right end elevational view of the part of FIG. 4.

FIG. 7 is a side elevational view of another embodiment of the invention wherein the base portion is disposed concentrically and outside of the threaded portion or nut proper, and FIG. 8 is a view like that of FIG. 7 but with the base portion of the nut construction shown in axial section to reveal interior details.

Referring first to FIG. 1, the improved nut construction is shown as being carried by a machine part or piece of equipment having a support portion 10 which receives mounting screws 12 that pass through a mounting flange 14 constituting part of the nut assemblage. As seen in FIGS. 5 and 6, the flange 14 is triangular, although it can be circular or have any other suitable shape.

The nut construction further comprises a base portion 16 and the nut proper in the form of a threaded portion 18. The flange 14, base portion 16 and threaded portion 18 are constituted of a single piece of plastic whereby they are all integral with each other.

The base portion 16 and threaded portion 18 have through bores 20 and 22 respectively, which are aligned with each other and receive a lead screw 24 that constitutes part of the equipment, such screw passing through the support portion 10.

In accordance with the invention, the base portion and threaded portion have uniquely-placed cut-outs which are so related as to provide a highly effective spring mounting for the nut proper, whereby there is had, in effect, an angular accommodation in holding the nut, while at the same time relatively few slots are utilized in the accomplishment.

As shown, the base portion 16 has a pair of aligned slots 26, 28 disposed near the mounting flange 14, each slot extending circumferentially for slightly less than 180° with the ends terminating closely adjacent each other. These circumferential slots 26, 28 provide for lateral angular movement of the base portion with respect to the mounting flange 14, in one given plane passing through the axis of the screw 24.

Spaced from the slots 26, 28 there are provided two additional circumferential slots 30, 32 which are similar to the slots 26, 28 but disposed rotatably 90° from the first two. The slots 30, 32 enable the threaded portion 18 to have lateral angular movement with respect to the base portion 16 in another given plane which is 90° rotated with respect to the first-mentioned plane.

The slots 26, 28, 30 and 32 are hereinafter referred to in the appended claims as cut-out configurations, with the slots 30, 32 comprising a pair of circmferential slots. It will be noted that the pairs of slot ends of the circumferential slots 30, 32 and the respective ends of the pair of longitudinal slots 34, 36 of the threaded portion 18 are triangularly disposed, and the slot ends of the pair of circumferential slots 30, 32 are separated from each other by an uninterrupted solid wall of the threaded portion 18, which uninterrupted solid wall extends, directly and in a straight line between the slot ends of the pair of circumferntial slots 30, 32, so as to provide increased body and strength at that location, such solid wall portions having a certain amount of resilience by which the above-mentioned lateral angular movements can occur.

To enable the threaded portion 18 of the nut assemblage to snugly hug the threads of the lead screw 24 at all times without looseness or backlash, such threaded portion is provided with a pair of longitudinal slots 34, 36 which lie in a plane parallel to and passing through the axis of the lead screw 24. The slots 34, 36 enable two halves or elements 38, 40 of the threaded portion 18 to have limited radial movement toward and away from each other. The elements 38, 40 have internal threads 42 in the bore 22 as indicated by the broken lines in FIG. 3, for engagement with the threads of the lead screw 24.

I have found that an improved angular freedom of movement is had, of the threaded portion 18 when the ends of the slots 34, 36 are stopped short of the plane containing the slots 30, 32. In other words, when the ends of the slots 30, 32 together with the ends of the slots 34, 36 are disposed in a triangular configuration, as clearly seen in FIGS. 1, 2 and 3, there is had a greatly improved angular movement of the threaded elements 38, 40—so much that it is not desirable or necessary to utilize additional pairs of slots in the base portion 16 of the nut construction. As a consequence, the elimination of the additional slots with the needed machining operations results in a desirable economy of manufacture while at the same time improved performance is achieved. As seen in FIG. 3, the slot ends define such a triangle, and the ends of the slots 30, 32 are separated by a solid wall portion of the base 16. The improved angular freedom has been readily demonstrated with actual test models, using a plastic substance such as Delrin ™ in forming the piece pictured in FIGS. 3-6.

Further, in accordance with the invention, a simplified means is provided to restrict or limit the relative outward radial movements of the threaded elements 38, 40. Normally the elements 38, 40 are yieldably biased inward or toward each other, as by a garter spring 46 shown in FIGS. 1 and 2, such spring being accommodated in an annular groove 48 formed in the elements 38, 40. By the present invention a non-expansible sleeve 50, such as formed from aluminum, is provided surrounding the threaded portion 18 and held in place by its abutment with the spring 46. The sleeve 50 is loose on the threaded portion, but small enough in diameter to limit the radial expansion of the threaded portion whereby it prevents disengagement between the threads of the lead screw 24 and the threaded portion 18 in the event of any overloads. The sleeve is easily slipped in place prior to placement of the spring 46 during the assembly of the nut construction, as can be readily understood.

Another embodiment of the invention is illustrated in FIGS. 7 and 8, wherein the nut portion of the construction is disposed concentrically within the base portion thereof.

As shown, the equipment has a follower part 10 which has a bore 52 in which there is frictionally received or cemented one end 54 of a cylindrical sleeve 56. The other end 58 of the sleeve is internally shouldered and receives one enlarged end 60 of the base portion 16a, which can be affixed for example by suitable cement.

The lead screw 24 passes through the bores of the sleeve, and base and threaded portions, and engages the threads of the latter. Such threads can be disposed mainly in the two parts 38a, 40a and can be absent from the end 60 of the base portion, as will be understood.

As provided by the invention, slots are formed in the threaded portion 18a, one slot 34a being seen in FIG. 8 and terminating short of ends of slots 30a, 32a with which a triangle is outlined. The angular freedom obtained by the triangular disposition of the slot ends has already been explained in connection with the embodiment of FIGS. 1–6.

The sleeve 56 is provided with three pairs of slots, labelled respectively 62, 64; 66, 68; and 70, 72. The slots 66, 68 and 70, 72 are in parallel planes which are normal to the axis of the screw 24, and are in registration respectively. The slots 62, 64 are in a third parallel plane, and are 90° rotated with respect to the slots 66, 68, 70 and 72. The three pairs of slots in the sleeve 56 in conjunction with the slots machined in the threaded portion 18a and base portion 16a provide for excellent parallel alignment or positioning of the threaded portion on the screw 24, compensating completely for small variations or run-out in the equipment in which the nut construction is installed.

It can now be seen from the foregoing that I have provided an improved, angularly accommodating, no-backlash nut construction wherein fewer slots are needed while still giving adequate angular freedom of movement for the nut proper. Relatively few components are involved in the assembly, and the parts are simple and straight forward to eliminate possible malfunctioning.

Variations and modifications are possible without departing from the spirit of the invention.

I claim:

1. A simplified anti-backlash nut construction having relatively few slots, comprising in combination:
   (a) a base portion adapted to be carried by a supporting part and having a bore through which a screw can pass,
   (b) a one-piece threaded portion connected to said base portion and characterized by a bore aligned with the bore of the base portion,
   (c) said threaded portion having a pair of longitudinal slots in it by which it is divided into elements having internal surfaces at the bore thereof,
   (d) said elements having thread formations on said internal surfaces, adapted for engagement with the external threads of a screw extending through said bores,
   (e) said threaded portion having a cut-out configuration comprising a pair of circumferential slots characterized by two pairs of slot ends which are respectively located adjacent the ends of the said longitudinal slots, said cut-out configuration facilitating the limited movement of the said divided elements toward and away from each other, thereby to enable the thread formations thereof to engage a screw with no clearance and looseness,
   (f) said pairs of slot ends and the respective ends of the said pair of longitudinal slots of the threaded portion being triangularly disposed, and the slot ends of said pair of circumferential slots being separated from each other by an uninterrupted solid wall of the threaded portion, which uninterrupted solid wall extends directly and in a straight line between the slot ends of the pair of circumferential slots so as to provide increased body strength at such location, and
   (g) yieldable means carried by said divided elements, biasing the same in directions toward each other so as to maintain them closely engaged with the said screw.

2. An anti-backlash nut construction as in claim 1, and further including:
   (a) an unyielding annulus encircling said threaded portion, restricting diametric enlargement of the same to a predetermined amount which is sufficiently small to prevent disengagement of the thread elements from the screw.

3. An anti-backlash nut construction as in claim 2, wherein:
   (a) said threaded portion has an annular groove,
   (b) said yieldable means comprising an annular spring disposed in said groove,
   (c) said unyielding annulus abutting said spring and being retained thereby on said threaded portion.

4. An anti-backlash nut construction as in claim 3, wherein:
   (a) said unyielding annulus comprises a metal sleeve enclosing portions of the said slot in the threaded portion.

5. An anti-backlash nut construction as in claim 1, wherein:
   (a) said longitudinal slots lie in a single plane which passes through the axes of the bores of the base and threaded portions.

6. An anti-backlash nut construction as in claim 1, wherein:
   (a) the triangular disposition of the slot ends is essentially isosceles.

7. An anti-backlash nut construction as in claim 1, wherein:
   (a) the threaded portion constitutes an extension on the end of the base portion.

8. An anti-backlash nut construction as in claim 1, wherein:
   (a) the threaded portion has a stepped exterior comprising different diameters.

9. An anti-backlash nut construction as in claim 1, wherein:
   (a) the nut construction has an additional cut-out configuration characterized by pairs of slot ends which have an angularly-rotated orientation with respect to the first-mentioned pairs of slot ends.

10. An anti-backlash nut construction as in claim 1, wherein:
    (a) said supporting part comprises a spring sleeve surrounding said base and threaded portions,
    (b) one end of said sleeve being secured to one end of the base portion,
    (c) the other end of the sleeve being adapted to be carried by a machine part,
    (d) said sleeve having three pairs of slots disposed respectively in three spaced planes which are normal to the axis of the screw,
    (e) each sleeve slot being slightly less than 180° in extent and each pair of sleeve slots extending for slightly less than 360°,
    (f) two of the pairs of sleeve slots registering with each other and the third pair of slots being 90° out of registration with said two pairs.

11. An anti-backlash nut construction as in claim 10, wherein:
    (a) said spring sleeve is co-extensive with the combined base and threaded portions of the nut construction.

12. An anti-backlash nut construction as in claim 10, wherein:
    (a) said one end of the base portion is of enlarged diameter,
    (b) said one end of the sleeve having an enlarged bore providing an internal shoulder against which the enlarged end of the base portion is fitted.

13. An anti-backlash nut construction as in claim 1, wherein:
    (a) the ends of the longitudinal slots are spaced a substantial distance from the plane containing the said two pairs of slot ends of the cut-out configuration of the nut construction.

14. A simplified anti-backlash nut construction having relatively few slots, comprising in combination:
   (a) a base portion adapted to be carried by a supporting part and having a bore through which a screw can pass,
   (b) a threaded portion connected to said base portion and characterized by a bore aligned with the bore of the base portion,
   (c) said threaded portion having a pair of slots by which it is divided into elements having internal surfaces at the bore thereof,
   (d) said elements having thread formations on said internal surfaces, adapted for engagement with the external threads of a screw extending through said bores,
   (e) said nut construction having a cut-out configuration characterized by two pairs of slot ends which are respectively located adjacent the ends of the said slots of the threaded portion, said cut-out configuration facilitating the limited movement of the said divided elements toward and away from each other, thereby to enable the threaded formations thereof to engage a screw with no clearance and looseness,
   (f) said slot ends and the ends of the slots of the threaded portion being triangularly disposed, and the slot ends of said pairs being separated from each other by a solid wall of the base portion so as to provide increased body and strength at such location, and
   (g) yieldable means carried by said pair of divided elements, biasing the same in directions toward each other so as to maintain them closely engaged with the said screw,
   (h) the ends of the slots of the threaded portion terminating short of the plane containing the said two pairs of slot ends of the cut-out configuration of the nut construction.

* * * * *